LUCCOCK & GOWDY.
Churn.

No. 35,101.    Patented April 29, 1862.

Witnesses:
A. Pohler.
S. A. Sambaschmidt

Inventors:
John Luccock
John M. Gowdy
by their Atty
Wm D Baldwin

UNITED STATES PATENT OFFICE.

JOHN LUCCOCK AND JOHN McLIN GOWDY, OF PEORIA, ILLINOIS.

IMPROVEMENT IN CHURNS.

Specification forming part of Letters Patent No. 35,101, dated April 29, 1862.

*To all whom it may concern:*

Be it known that we, JOHN LUCCOCK and JOHN McLIN GOWDY, both of the city and county of Peoria, in the State of Illinois, have invented a new and useful Improvement in Churns, of which the following is a full, clear, and exact description, reference being had to the accompanying drawings, which make part of this specification, and in which—

Figure 1:
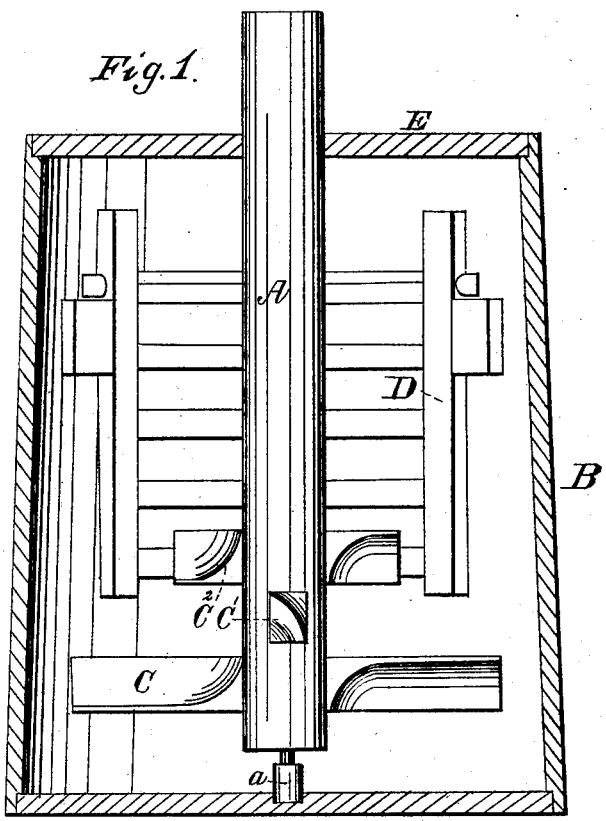
Figure 2:
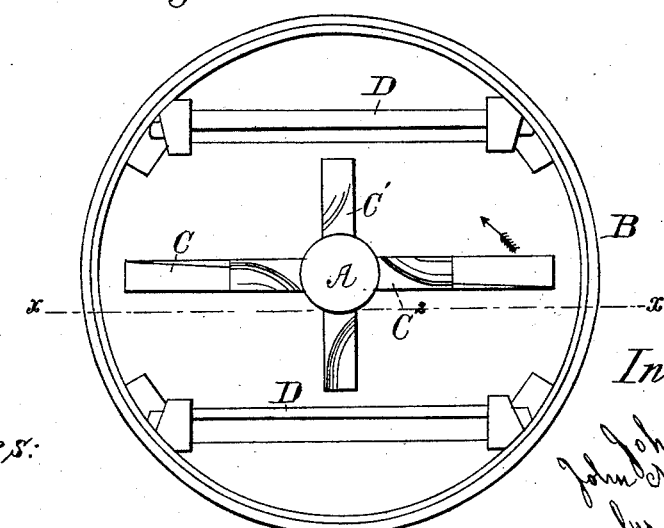

Figure 1 represents a vertical transverse section through a churn embracing our improvement at the line $x\ x$ of Fig. 2; and Fig. 2 represents a plan or view of the same as seen from above, the lid or cover being removed.

It is the object of our invention to provide a churn which shall combine in a high degree the advantages of making butter quickly, economizing labor, and making the greatest practicable quantity of butter from a given amount of milk; and to this end our improvement consists in the combination of a rotary dasher consisting of a series of winding wings or curved beaters of varying lengths with a series of racks or breakers arranged within the churn, the dashers occupying such a relation to the racks that the ends of one set of wings traverse within the racks, while those of the others pass beyond the racks, thus creating counter-currents in opposite directions through the rack, which impinge upon each other, and thus facilitate the rupture of the oil-globules and disturb the rotary current created by the dashers.

In the accompanying drawings our improvement is represented as applied to a churn of cylindrical form. In this instance the dasher-shaft A is represented as turning on a pivot, $a$, on the bottom of the casing or box B. The vanes or beaters C C' C² are formed with a curve or wind similar to those of a flutter-mill, and are inserted into the shaft A at right angles thereto. A rack or breaker, D, composed of a series of parallel slats or bars secured in a suitable frame, is placed upon each side of this shaft on the inner side of the casing, about half-way between the bottom and top of the churn. The arms of the lower dasher, C, are longer than those of the others, so that in their rotation they extend beyond the rack and traverse near the bottom of the churn. The middle dasher, C', is shorter than the other and rotates within and near the lower edges of the racks D, while the upper beaters, C², revolve within the racks above their lower edges.

The operation of the churn is as follows: The box being filled with milk or cream, rotary motion (in the direction indicated by the arrow, Fig. 2) is imparted to the shaft A by means of suitable gearing upon the box or casing. The action of the lower beaters, C, is such that the milk is forced outward and upward from the bottom in a spiral path, passing through the breakers D. This action is assisted by that of the middle beaters, C', while that of the upper ones, C², tends to create a counter-current as it breaks up the downward flow around the shaft caused by the action of the lower beaters and forces the milk upward and outward through the racks. The two opposing currents thus created by the beaters impinge against each other and the opposite sides of the racks, and rapidly rupture the oil-globules—an essential step in the process of making butter.

The milk, it will be observed, is agitated mainly near the bottom, while its surface remains comparatively quiet. We have found this mode of operation to aid the rapid formation of butter. The racks D are merely suspended upon blocks secured inside the churn, and, together with the dashers, may readily be removed, for the purpose of cleansing the churn, by taking off the cover E.

The above-described churn we have found by experiment to accomplish every object desired in a very satisfactory manner.

Having thus fully described the construction and operation of our improved churn, what we claim therein as new, and desire to secure by Letters Patent, is—

The combination of the rotary dashers C C' C², of unequal lengths, with the racks or breakers D, when constructed, arranged, and operating as herein described, for the purpose set forth.

In testimony whereof we have hereunto subscribed our names.

JOHN LUCCOCK.
    JOHN McLIN GOWDY.

Witnesses:
 HARRISON SMITH,
 JAMES DELANO.